June 13, 1961      J. R. OISHEI ET AL      2,987,747
ELECTRIC WINDSHIELD CLEANER
Filed Jan. 23, 1958      4 Sheets-Sheet 1
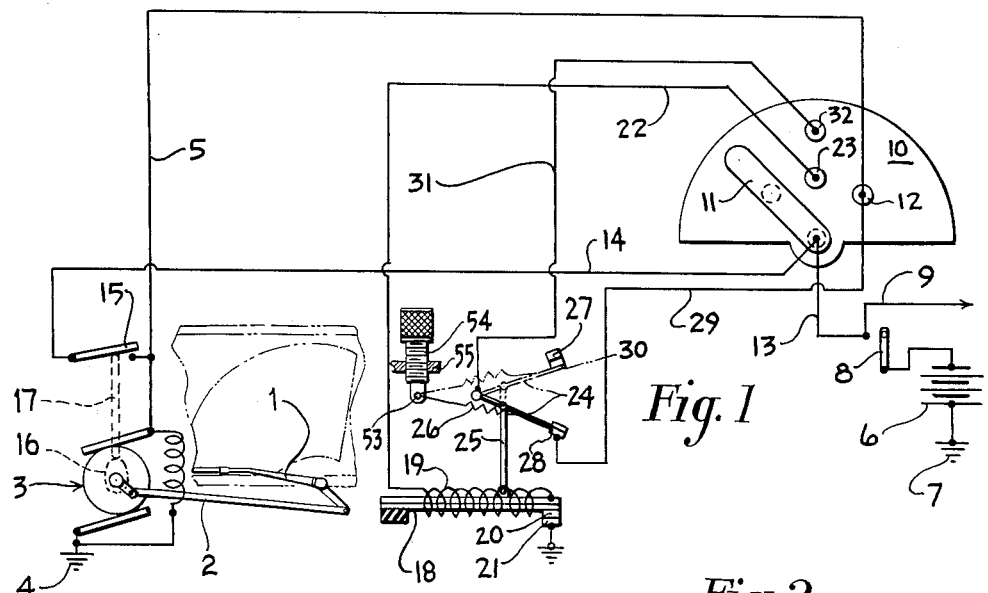
Fig. 1
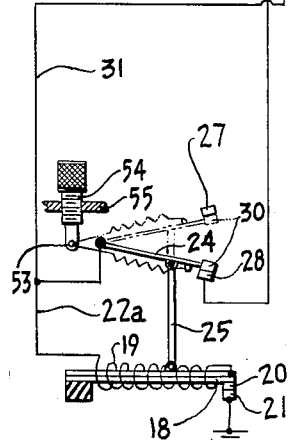
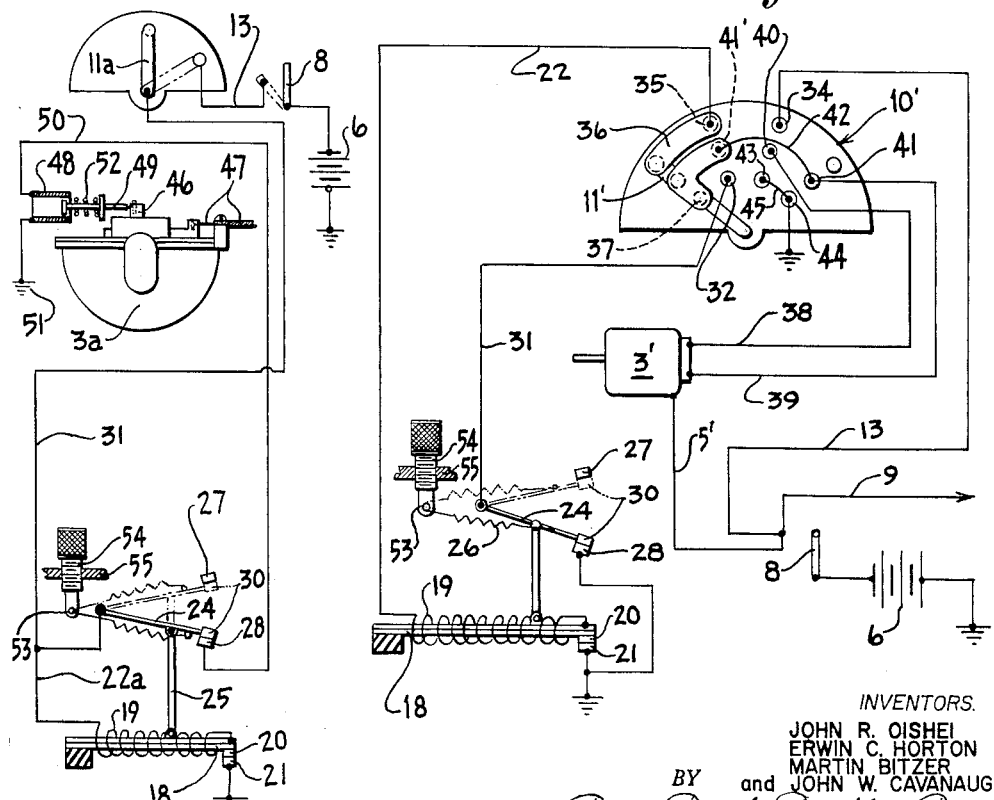
Fig. 2
Fig. 3
INVENTORS.
JOHN R. OISHEI
ERWIN C. HORTON
MARTIN BITZER
and JOHN W. CAVANAUGH
BY Bean Brooks Buckley & Bean
ATTORNEYS

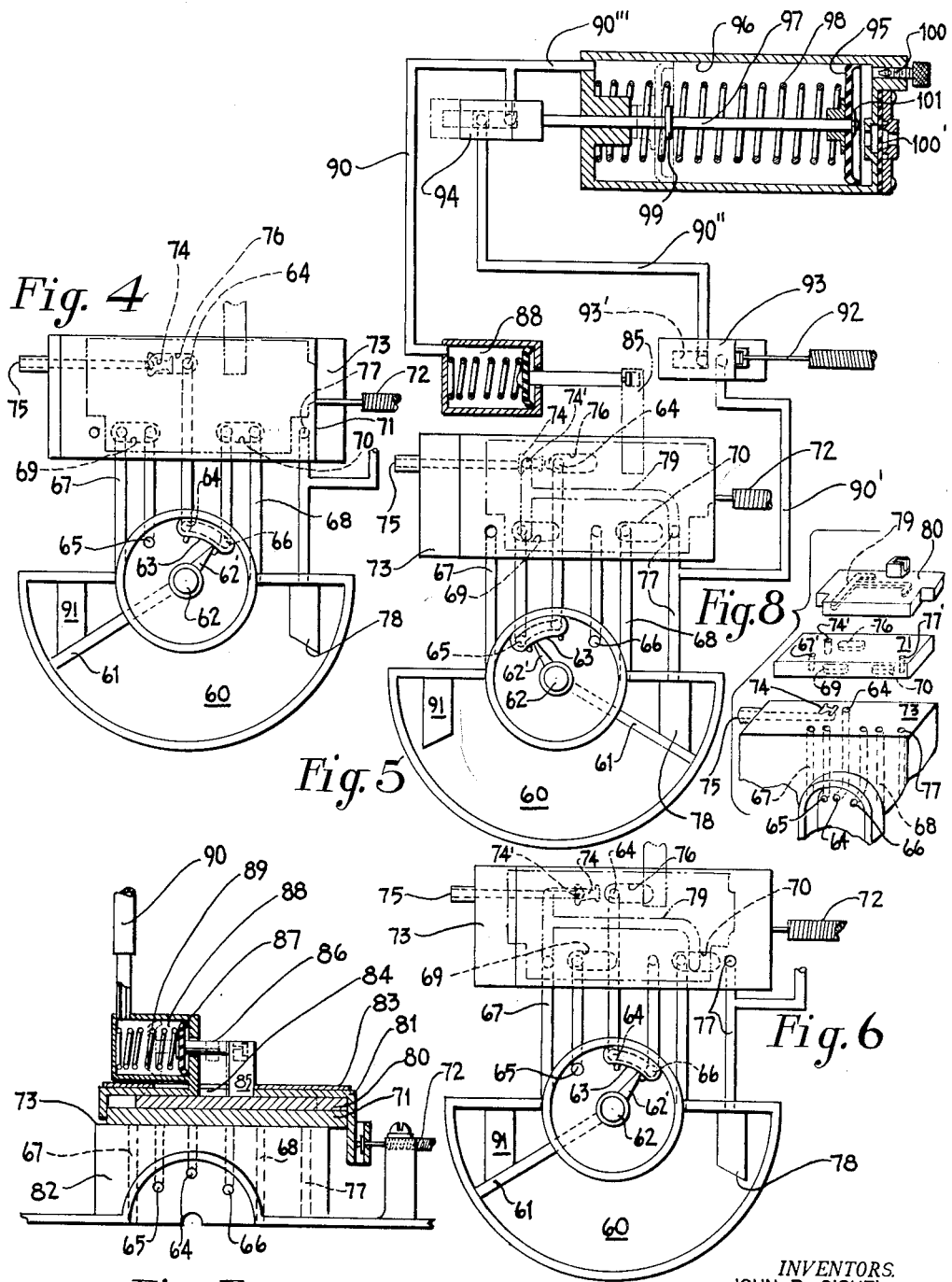

June 13, 1961
J. R. OISHEI ET AL
2,987,747
ELECTRIC WINDSHIELD CLEANER
Filed Jan. 23, 1958
4 Sheets-Sheet 3
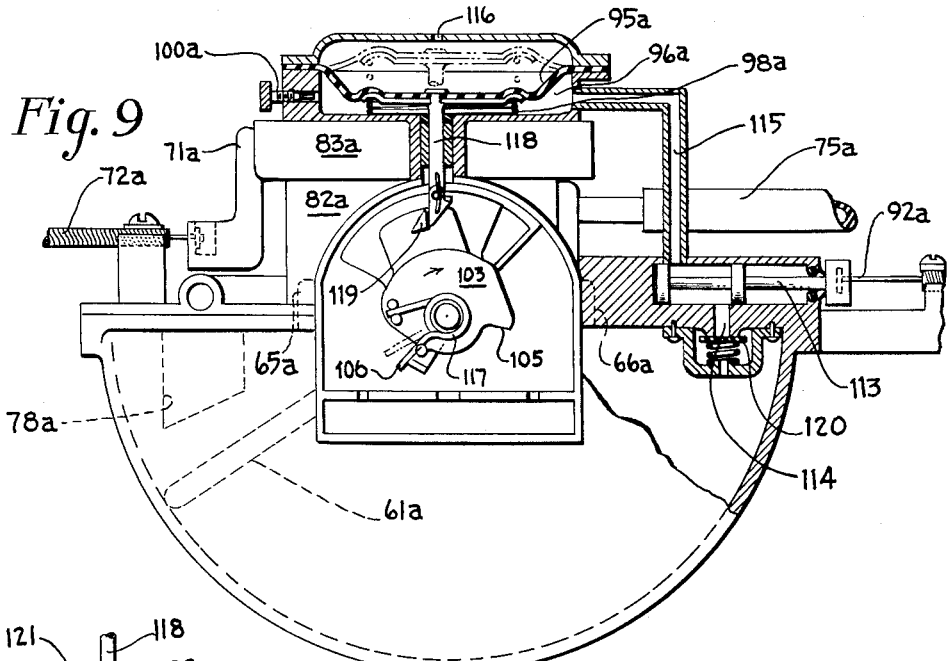
Fig. 9
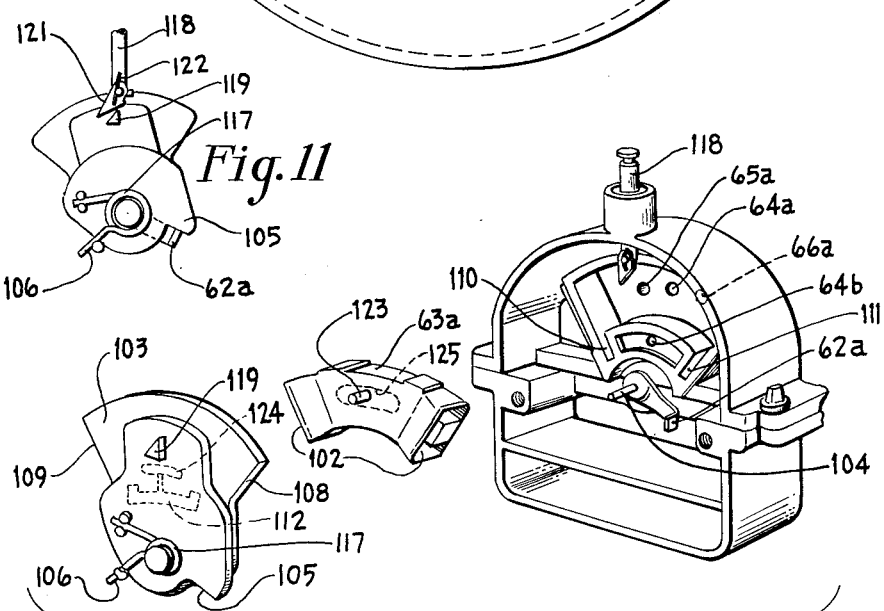
Fig. 11
Fig. 10
INVENTORS.
JOHN R. OISHEI
ERWIN C. HORTON
MARTIN BITZER
BY and JOHN W. CAVANAUGH
Bean Brooks Buckley + Bean
ATTORNEYS

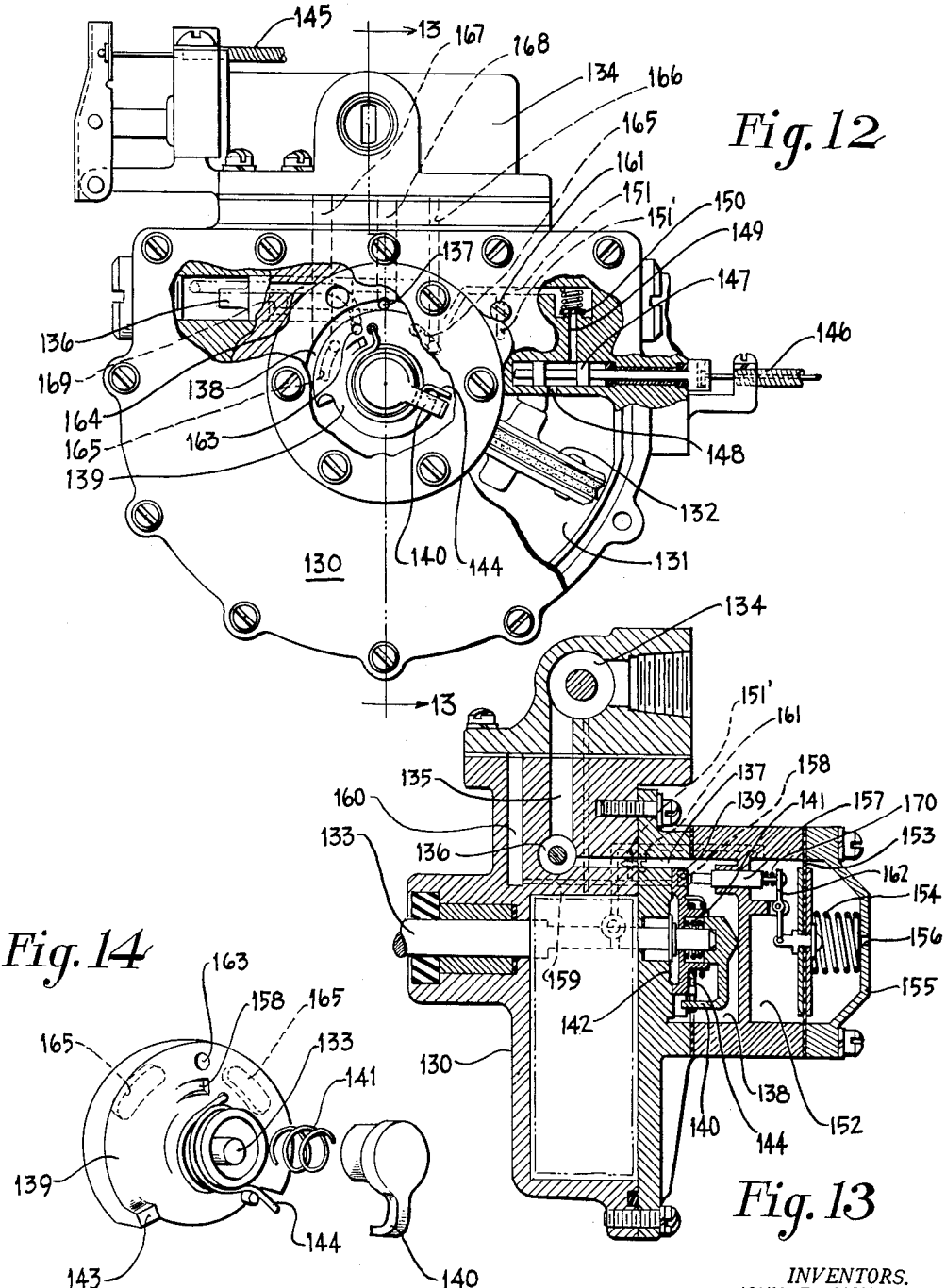

United States Patent Office 2,987,747
Patented June 13, 1961

2,987,747
ELECTRIC WINDSHIELD CLEANER
John R. Oishei, Buffalo, Erwin C. Horton, Hamburg, Martin Bitzer, Kenmore, and John W. Cavanaugh, Lackawanna, N.Y., assignors to Trico Products Corporation, Buffalo, N.Y.
Filed Jan. 23, 1958, Ser. No. 710,703
18 Claims. (Cl. 15—250.16)

The object of this invention is to provide a windshield cleaner system having timed interruptions in its operations so as to confine the movement of the wiper to a predetermined cycling, with intervening rest intervals of the blade or wiper preferably in the parked position and out of the line of vision.

The interrupted cycling introduces a new method of windshield wiping in which the vision is effectively maintained without constant action of the wipers across the wiping paths of normal blade travel. The system is particularly desirable for very mild precipitation where the windshield is sparsely wetted and the accumulation of vision-obstructing density of raindrops occurs only after extended distances of travel of the motor vehicle. Under such conditions, which now frequently occur over extensive stretches of the arterial highways used for traveling long distances, the motorist traveling at higher speeds frequently runs into weather variations in which extremely mild rainfall is encountered, often not of a nature that requires uninterrupted continuity of wiping action such as is otherwise needed in heavier rain downfall.

The purpose of the instant invention is to meet atmospheric conditions where slight sprinkles are so abbreviated that, even at the lowest rate, continuous wiper operation is unwarranted and unnecessarily repeats the wiping motion when it is not needed. The normally continuous stroking of the wiper blades creates a vision determent rather than better seeing power through the windshield, and produces a condition difficult to see through. However, such slight sprinkles provide ample lubrication on the shield for a single cycle wipe of the blade and, this single cycle wipe, with sufficient lubrication therefor, eliminates the otherwise streaking of the glass with ribbon-like streamers running across the field of vision, which occurs with continuous oscillation. Provision is being made herewith to automatically avoid the vision-blurring streamers by awaiting more raindrop accumulation, through automatic intermittent operation of an on-and-off function of automatic cycling control.

With a lack of sufficient moisture on the glass, neither the wiping blade element nor the glass becomes fully wetted. Under these conditions the minor pick up of water by the blade is stretched out through an effect of capillary attraction into an aerated film (sometimes referred to as "lace curtains"). This film is induced where the glass has, to begin with, a slight coating of oil films from exhaust gases and the like. If the wiper blade is continuously oscillated, the light rain deposit persistently forms this thin covering. If the motorist would turn the wiper on and promptly shut it off, he would have clearer vision.

The primary object of this invention is to do automatically what the motorist would be compelled to do manually and at the cost of having the driver's attention diverted from keeping his eyes on the road and his hand on the wheel.

A further object of the invention is to stop the blade and let the air moving over the glass front evaporate the "lace curtains" that are left behind the movement of the blade.

A still further object of the invention is to provide a windshield cleaner system devoid of monotony, to further dispel the hypnotic, pendulum motion of constant action wipers, such as the electric motor types powered from the battery. This recognized drawback, prevalent in battery powered wipers in their use particularly on long, uninterrupted turnpikes and thruways, is met on two counts. The swinging wand-like blades are periodically arrested for as much as seventy-five percent of the running time, and the otherwise audible rythmic drone of the electric motor is interrupted. Both of these undesirable features, otherwise imposed, are overcome by the automatic governor which, for greater safety, converts the wiper into more of an alerting means instead of being a contributing cause or inducement to drowsiness.

To accomplish this, the wiper motor may be provided with electrical contacting means to close the circuit to start the wiper for its operation of intermittent cycling and likewise provide the interval periods for arresting the wiper in its normally parked position between the successive wiper cycling operations.

Alternately, this periodic cycling feature of the wiping system may be initiated by fluid pressure means to function in much the same manner as described above to time the cyclic operations with inactive periods, the active and inactive phases being for such intervals as may be desired and determined in the design and adjustment of the mechanism.

Dealing with the first mentioned electrical control, suitable primarily for the operation of the electrically operated windshield wiper motor, the latter is manually turned on by closing the circuit to initiate the determined cycle of the blade movement for the desired pattern wipe. In this operation, the blade is automatically arrested by the opening of the circuit at the end of the blade travel, in the customary manner employed for the parking of electric windshield wiper systems. A cycling thermal switch, secondary to the primary control, functions at the completion of the determined wiping cycle to interrupt the flow of the electric current through a heating coil associated with a bi-metal strip. This interruption permits the thermal switch to cool and again close the circuit, in the nature of a repeater circuit coupling, to automatically continue with a second wiper cycling. This heating and cooling of the bi-metal strip furnishes the time determining interval during which the blade will remain at rest and unresponsive until the cooling of the bi-metal strips closes the circuit to repeat the operation described. Once initiated, the time delay mechanism employed for repeated intermittent cycling will continue until the manually operable actuator is moved to the off position whereupon the circuit to the bi-metal coupling is cut off to make it non-operative. Thereafter, the wiper will respond only to the normally used primary actuator through which the electric windshield wiper is normally controlled.

For fluid pressure systems, the fluid pressure wiper motor may comprise the usual control valve with a primary actuator and a secondary independent actuator each capable of adjusting the control to operate the fluid pressure motor. Or special porting may be provided to connect the motor to the source of power, such as the intake manifold of the engine or an auxiliary booster pump, in response to the intermittent cycling actuator, connecting the wiper motor through fluid passageways to set up a differential pressure in the motor chamber. With the connection of the fluid passageways, the wiper motor will function to execute a single cycle, or other determined active period, of the wiper from its inner parked position to the extreme outer run of the normal blade pattern, and back again to the normally parked position on the windshield frame.

The timing mechanism relied on for the intervening rest interval, between active wiping periods, may be in the form of a secondary fluid pressure operated coupler that is under the control of the secondary actuator. In construction, the coupler consists of a piston and cylinder provided with a fluid bleed port which may be made adjustable in order for the driver of the vehicle to regulate the length of the intervening rest period between the wiping cycles, such bleed port being designed to slowly vent the piston chamber under the urge of a compression spring, which is employed to return the piston to its parked position. In this manner the coupler piston movement, as it returns to the point of starting, trips a secondary valve to reopen the conduit connection and thereby effect a repetition of the wiping cycle automatically. The fluid pressure time delay mechanism will continue to repeat the movement of the secondary valve in response to the intermittent coupler control assembly as long as the secondary actuator is functioning. Acting independently of the intermittent control assembly is the control valve normally used for the operation of the wiper in its usual manner, including the speed selectivity and pattern range selectivity. As in the electric embodiments, the intermittent pneumatic system is disconnectible from the secondary actuator to leave the wiper system under the normal control of its standard operating actuator.

The foregoing and other objects will manifest themselves in the following description wherein reference is made to the accompanying drawings on which:

FIG. 1 is a diagrammatic view of one embodiment of an electric windshield cleaner utilizing an electrically timed coupler unit in accordance with the present invention;

FIG. 2 is a like view of another embodiment in which the electric motor reverses to park the wiper;

FIG. 3 is a third embodiment showing a fluid pressure type of windshield cleaner;

FIGS. 4, 5 and 6 are diagrammatic views showing a fluid pressure timed coupler unit in a fluid actuated windshield cleaner system, respectively, in the wiper running position, in the wiper parking position, and in the periodic wiper cycling position, FIG. 5 showing the complete diagrammatic layout;

FIG. 7 is a fragmentary sectional view through a portion of the control valve means;

FIG. 8 is an exploded view of the primary and secondary control slide valves;

FIG. 9 is a further embodiment of a fluid actuated windshield cleaner with a modified coupler unit;

FIG. 10 is a fragmentary exploded view, in perspective, of a portion of the motor;

FIG. 11 is a detail view of a part thereof;

FIG. 12 is a view similar to FIG. 9 but showing the invention as applied to a hydraulic system;

FIG. 13 is a sectional view on line 13—13 of FIG. 12; and

FIG. 14 is a detail view of a part thereof.

Referring more particularly to FIG. 1 of the drawing, the numeral 1 designates a windshield wiper that is operatively connected through a suitable transmission 2 to an electric motor 3, grounded at 4 and connected by wire 5 to a battery 6 grounded at 7 to complete the electric circuit. The usual key switch 8, in the ignition circuit 9, is also included in the windshield cleaner circuit 5 along with the primary control switch 10. After closing the ignition switch 8 and by moving the switch arm 11 of the primary control over onto its contact point 12, the main wiper circuit between battery 6 and motor 3 will be closed through wires 5 and 13 to energize the motor for normal wiper operation. When the switch arm is restored to its wiper parking position shown, a parking circuit will be closed through wires 13, 14 and switch 15 to move the wiper beyond its normal wiping path to its parked position, at which time the parking circuit is broken by the motor driven cam 16 acting through the rod 17 to open the parking switch 15, all in an automatic manner.

In accordance with the present invention, periodic cycling means are provided to intermittently operate the wiper for relatively brief periods and at stated intervals to wipe the windshield clear of any slow accumulation where the rate of moisture deposit is insufficient to properly lubricate the wiper against smearing the field of vision. The intervening periods of rest permit a greater accumulation of moisture on the surface between wiping cycles to provide ample lubrication for the wiper when it again becomes active to clear the field of vision.

In the embodiment depicted in FIG. 1, the periodic cycling means is in the form of an intermittently acting circuit breaker which functions to energize the wiper periodically for affording a series of intermittent wiping actions, each action having one or more wiping cycles, followed by a rest or inactive interval. For example, each inactive interval between wipes may last for eight or ten seconds. This is accomplished by providing a secondary circuit including a timing device for opening and closing the circuit. In this embodiment the timing device is a thermal bar 18 of bi-metal form, with an associated heating coil 19 to deflect the bar contact 20 from the grounding contact 21, the other end of the heating coil being connected by a parallel circuit wire 22 to contact 23. The timing device or thermal bar 18 is mechanically connected to an automatic switch 24, in the cycling circuit, by a link 25 having play connection therewith so that an overcenter spring 26 will snap the arm back and forth between a stop 27 and the contact point 28, the latter being connected by circuit wire 29 to wire 5. The timing device thereby becomes an automatic actuator for the cycling switch 24. After the secondary or cycling circuit has been manually closed by moving switch arm 11 into engagement with contact 23, which opens the parking circuit 14, the timing device 18 with its control 24 will thereafter periodically operate the wiper for as long as the arm 11 is so positioned. During this periodic operation the switch arm contact 30 will make and break contact with point 28 to close and open the cycling motor circuit for the intermittent active periods, the switch arm 24 being also connected by wire 31 to contact point 32 which latter is engageable along with contact point 23 by the switch arm 11. This intermittent active circuit is from the source of electric energy, through the ignition switch 8, wire 13, control switch arm 11, and from hereon divides, one branch continuing through contact 32, wire 31, circuit breaker arm 24, contact 30, wires 29, 5, motor 3 and ground 4, and the other branch continuing through contact 23, wire 22, heating coil 19 and ground 21. To conclude the periodic wiping action, it is only necessary to return the common control switch arm 11 to its normally inoperative position which parks the wiper.

In the embodiment depicted in FIG. 2, the arrangement and operation is similar to that set forth above, with the exception that the wiper motor 3' reverses itself for parking the wiper beyond its normal range and this necessitates a modified primary control switch 10'. The functioning and operation of the timing device, including the actuator 18, its heating coil 19, the switch arm 24, and their parts, are carried out in like order. The battery 6 is connected to the ignition circuit 9 and to the windshield cleaner circuit wire 13 by the ignition key switch 8, but the wire leads to a switch contact 34 which pairs off with another switch contact 35 for being closed by a bridging contact 36 on the control switch arm 11' to close the heating coil circuit through wire 22. The circuit breaker arm 24 is connected by wire 31 to switch contact 32 for being engaged by contact 37 on the control switch arm 11'.

The wiper motor 3' is connected to battery 6 through wire 5' and ignition switch 8 and, being reversible to effect the parking of the wiper, has circuit wires 38 and 39 leading to switch contacts 40 and 41, respectively, with the contact 41 being placed by a jumper wire 42 in electrical connection with a second contact 41'. Two grounding contacts 43 and 44 are tied together by a jumper wire 45. When the control switch arm 11' is moved one step to the right, FIG. 2, the contact 36 will bridge contacts 34 and 35 and close the circuit for the heating coil 19. The control switch arm 11' will simultaneously connect wires 38 and 39 through contacts 40 and 41 and shorting bar 37 to wire 31 by means of contact 32 and thence through breaker arm 24, contact 30, contact 28 to ground which completes the control circuit necessary to initiate operation of wiper motor 3'. Heating by coil 19 of the thermostatic bar 8 will cause contact 20 to open from contact 21 breaking the heating circuit and simultaneously open contact 28 from contact 30 causing the motor to park.

In the embodiment of FIG. 3, the inventive concept is embodied in a fluid motor, such as a vacuum motor 3a of a well-known type, the same having a vane piston fixed to a shaft for oscillating the same as a fluid pressure differential is alternately applied to the opposite sides of the piston by shaft actuated automatic valve mechanism. The motor has a control valve 46 slidable manually by a Bowden cable 47 to operate the wiper normally and to park the wiper beyond its normal range. A solenoid 48 has its armature 49 connected to the control valve 46 for automatic operation. The solenoid 48 is connected in an electric circuit 50 grounded at 51 and includes the contacts 28 and 30, the breaker arm 24, wiring 31, control switch arm 11a, wire 13, ignition key switch 8 and battery 6. The heating coil 19 is in a branch circuit 22a, grounded at 21, and serves to energize the bi-metal bar 18 to actuate the circuit breaker 24 for deenergizing the solenoid 48 whereupon the spring 52 will project the armature to shift the control valve 46 to its "off" or wiper arresting position. As soon as the thermal bar 18 cools it will pull the breaker 24 to again close the solenoid circuit through contacts 28 and 30, and it will also close contact 20 upon contact 21 to again heat the thermal bar. Upon the reclosing of the solenoid circuit, the solenoid is again energized to shift the wiper control valve 46 to its motor operating position for another cycle or period of wiping action, and this intermittent stroking, alternating with the rest periods, will continue until manually stopped by moving the control switch arm 11a to the full line position, FIG. 3.

The active and inactive intervals may be regulated as to duration, by adjusting the point of anchorage for the spring 26. This is readily accomplished by anchoring the spring at 53 on a supporting screw 54 suitably threaded in a fixed part 55. By shifting the anchor point 53, the spring will vary its influence upon the time cycle of operation and the duration of the rest period for the wiper means. The screw 54 may be made accessible to the motor car operator by a suitable handle extension (not shown).

In these described embodiments, the periodic cycling has been effected by a coupler unit which is timed electrically to sustain the applied power for a determined interval of wiper operation and then to interrupt the applied power for another interval of time. In the embodiments illustrated in FIGS. 4 through 11, the applied power is sustained and interrupted by fluid pressure, such as vacuum, although the windshield cleaner system may be readily adapted for being operated by compressed air or hydraulic power in which latter instance a closed circuit will be provided for the pressurized medium, for example, in a manner as disclosed in Patent 2,802,232.

Referring to the embodiment depicted in FIGS. 4 through 8, a suction actuated windshield cleaner is shown by way of preference, the same showing diagrammatically a chamber 60 having a vane-like piston 61 carried by an output shaft 62 which is coupled to one or more wipers 1 (FIG. 1) by suitable transmission means 2. Like in FIG. 3, the fluid pressure differential is alternately applied to opposite sides of the piston 61 in a well known manner through suitable automatic valve mechanism having a valve element 63 movable back and forth between two operating positions by the shaft carried lug 62' to connect a pressure port 64 to one or the other of the two flanking ports 65 and 66, the latter being connectable to chamber ports 67 and 68 by recesses 69 and 70 in a primary control valve 71 that is slidable either to a wiper operating or running position or to a wiper arresting or parking position wherein the wiper is preferably parked beyond the running range. The main slide valve 71 is so shifted by a Bowden cable 72. The several ports 64, 65, 66, 67 and 68 open through a valve seat 73 along with the pressure port 74 which latter leads up from the supply passage 75 for the operating suction or negative pressure. A third recess 76, in the underside of the control valve 71, connects the pressure supply port 74 to the pressure port 64.

To park the wipers, the control valve 71 is shifted by the Bowden cable 72 to the position shown in FIG. 5 wherein the recesses 69 and 70 are rendered ineffective and the negative pressure supply port 74 is connected directly to a parking port 77 which opens into the right side of the motor chamber through a parking seat 78. This connection is established by a passage 79 formed in the underside of a secondary control valve 80 that is slidably superimposed upon the primary control valve 71 and registers with an extension port 77' in the latter. Concurrently, the secondary valve 80 uncovers an extension port 67' in the primary slide valve 71 by being brought into registry with the chamber port 67 to admit atmosphere to the left side of the motor chamber.

For obtaining the periodic cycling action, the two slide valves, primary 71 and secondary 80, are mounted within a carrier frame 81, FIG. 7, to which the wiper running and parking cable 72 is connected, and this frame is guidingly supported on the motor housing 82 by a retaining strap 83. The frame as well as the strap are provided with registering slots 84 through which rises a stem 85 from the secondary slide 80, and to this stem is connected a rod 86 forming a part of a piston 87 which operates within a cylinder 88 on the slide carrying frame 81. A spring 89 normally holds the piston 87 and the secondary slide 80 to the extreme right on the carrier frame 81. A suction conduit 90 opens into the far end of the cylinder 88 by which the piston 87 may be pressure actuated to shift the secondary slide valve upon the primary slide to the left position shown in FIG. 6 wherein the extension port 77' is uncovered to the atmosphere while the suction supply port 74 is connected by the passage 79 to the chamber port 67 through its extension port 67', whereupon the motor piston 61 will move clockwise one stroke against the stop 91 when suction is applied to the piston 87. The conduit 90 has a section 90' leading off from the parking port 77 and this section is normally closed by a valve 93 that is accessible by a second Bowden cable 92. A middle conduit section 90" leads from the valve 93 through a normally opened valve 94 into conduit 90. Therefore, a manual pull on the cyclic Bowden cable 92 will shift the valve recess 93' to join the two conduit sections 90' and 90" and thereby energize the piston 88 to bring the slide valves to the relation depicted in FIG. 6.

Concurrently with the evacuation of chamber 88, a timing device is energized to close the normally open valve 94 for sustaining the suction being applied to the piston 87 and holding the secondary valve 80 until the wipers have made their clockwise stroke. Thereafter, the spring 89 will reestablish the primary and secondary valves, after a time interval, to effect the return or counterclockwise stroke of the wipers to complete the full wiping cycle. This operation is accomplished by the timing device which comprises a piston 95 operating in a chamber 96. The piston is slidable along a rod 97 against the urge of spring 98 and idly plays along the rod until it encounters a shoulder 99 whereupon the rod, which is connected at its outer end to the normally open valve 94, will be carried by the piston to a valve-closed position to interrupt the communication between the conduit 90″ and the conduit 90.

An extension 90‴ establishes suction communication between the coupler motor chamber 96 and the suction conduit 90, 90′, 90″. Therefore, when the normally closed valve 93 is opened, by pulling on the cyclic cable 92, the suction energized parking port 77 will be connected through the normally open valve 94 to the chamber 96 of the timing device and also to the chamber 88 to impart the clockwise movement to the connected wipers. Upon pushing on the periodic cycling cable 92 the valve 93 will be restored to its normally closed position to interrupt the suction communication and thereby to trap the equalized pressure within the two chambers 88 and 96 until the low pressure is dissipated, as by means of an adjustable bleed 100, which latter restricts controllably the admission of atmospheric pressure thereinto during which the free piston 95 will idle along under the urge of spring 98 against the shoulder 101 and thereafter exert a pull upon the piston rod 97 to restore the valve 94 to its normally opened position. The spring 89 will then shift the secondary slide valve to its normal parking position depicted in FIG. 5, which effects movement of the motor piston 61 and its connected wipers in its counterclockwise direction.

In this embodiment just described, the coupler unit comprises the fluid pressure actuated timing device 95, 96 which serves to sustain the applied power for a predetermined time interval by holding the valve 94 closed until the negative pressure is dissipated through the adjustable bleed 100. To insure a quick response of the piston 95 to the suction admitted upon opening the valve 93, a flapper check valve 100′ may be provided in the outer end of the chamber 96 to freely admit atmosphere as the piston starts its initial movement along the rod 97.

It will be noted that when the secondary slide has been shifted by the piston 87 for clockwise movement of the wipers that the passage 79 is placed in communication with the suction supply port 74 through an extension port 74′ in the primary slide 71. It will also be noted that the parking port 77 will normally be closed to the atmosphere when the windshield cleaner is in normal operation. It will also be apparent that the wiper system is provided with two Bowden cable controls, one cable 72 functioning to move the primary slide for normal wiper operation and wiper parking and the other cable 92 serving for the intermittent wiping action, and then only to effect the relatively brief wiping period. Each wiping cycle ends with the parking of the wiper out of the field of vision to insure clear vision.

The modification shown in FIGS. 9, 10 and 11 simplifies the valving and utilizes a dual cable control in which both cables are jointly manipulated to obtain the intermittent wiping action. The wiper running and parking cable 72a acts to move the control valve 71a back and forth between parking and running positions, said control valve being suitably mounted and guided upon the motor body 82a by the retaining strap 83a. Manipulation of the control valve to its running position will connect the suction line 75a to the pressure port 64a for alternate connection with the two flanking chamber ports 65a and 66a by means of a recess 125 in the valving element 63a moving back and forth on the ported seat. The valving element 63a is in the form of a double acting piston having oppositely facing cupped packing flanges 102 to seal upon the seat as well as upon an overlying shuttle member 103. This in effect provides an auxiliary motor in which the valving element 63a moves in response to a fluid pressure differential as admitted by the shaft driven shuttle 103. This automatic power switching or valve action is fully described in earlier Patent No. 2,803,225. As the shaft carried piston 61a oscillates under the reverse applications of pressure differential thereto, it will rock its shaft 104 and the shaft carried lug 62a against opposing shoulders 105 and 106 on the shuttle 103 to rock it. The shuttle is slidably mounted on a rim 107 that delineates the motor chamber about the valve seat and its ports 64a, 65a and 66a, and has its opposite edges 108 and 109 valving across the passages 110 and 111 to alternately vent the cupped ends 102 of the auxiliary piston 63a to the atmosphere while opening the negative pressure to the opposite end in producing an operating pressure differential. The shuttle has a suction or pressure distributing channel 112 in communication with suction port 64b and this channel is shifted in a manner to alternately overlap the passages 110 and 111 to effect the desired reversal of pressure differential on the valving piston 63a.

To accomplish the periodic cycling action, the secondary or cyclic controlling cable 92a is moved inwardly to shift the valve 113 to a position for connecting a chamber port 114 to a passage 115 leading off to a pneumatic timing device having a motor chamber 96a with a diaphragm 95a therein. A spring 98a serves to urge the diaphragm to its elevated position. The passage 115 opens beneath the diaphragm to coact with an atmospheric vent 116 in providing a pressure differential for depressing the diaphragm against the urge of its spring 98a. An adjustable bleed 100a restricts the restoration of the diaphragm to its elevated position under the urge of its spring when the valve 113 is closed by a pull on the cyclic cable 92a. The purpose and function of the diaphragm 95a is to arrest the shuttle 103 against operation by the shaft lug 62a, and for this purpose the shuttle shoulder 106 is made yieldable. It is shown as constituting an end of a coil spring 117 carried on the shuttle. The diaphragm is provided with a shuttle arresting pin 118 that is depressible by the diaphragm into the path of a shuttle carried lug 119.

In normal operation, the shaft carried lug 62a will alternately engage the shuttle shoulders 105 and 106 to rock it back and forth for reversely applying an operating pressure differential on the auxiliary valving piston 63a which, in turn, operatively directs fluid pressure through the chamber ports 65a and 66a to the primary motor piston 61a. When the cleaner is to be parked beyond its normal running range, the Bowden cable 72a will be moved to shift the primary control valve 71a to its parking position for connecting the source of suction to the parking seat 78a.

To initiate the periodic cycling of the wipers, both Bowden cables are actuated, cable 92a to shift the valve to its full line position in FIG. 9 and cable 72a to start the piston 61a moving from off its parking seat 78a. The suction which is entering the motor chamber through chamber port 66a will also act through port 114 and passage 115 to depress the latch pin 118 into the path of the oscillating shuttle-carried lug 119 to hold the shuttle against reversing the pressure differential on the auxiliary piston 63a until sufficient atmosphere has bled through restricted port 100a to dissipate the negative pressure whereupon the spring 98a will retract the latch pin from the path of the lug 119 and allow the tensioned spring shoulder 106 to complete the shuttle movement. During this shoulder arrest of the shuttle the applied power on the piston 61a will be sustained for the time interval determined by the timing device 95a, 100a. Up to this time the shuttle shoulder 106 has been yielding to prevent injury to the motor parts, but as soon as the latch pin is retracted the spring energized shuttle will spring forward to complete its stroke port connecting position for the normal parking of the wipers. When the valve 113 is moved to its inoperative position, wherein the port 114 and passage 115 are disconnected, there is provided a spring seated check valve 120 to close said port. As a safety measure, should the latch pin descend prematurely to the opposite side of the shuttle lug 119, the nose 121 of the pin is made yieldably by means of a spring hinge 122 to enable the shuttle to continue on until the latch pin is properly disposed on the right side of said lug. The auxiliary piston 63a has an upstanding pin 123 working in a runway 124 on the underside of the shuttle 103 for establishing a play connection between the shaft driven shuttle and the auxiliary piston to assure proper positioning of the combined auxiliary piston and distributing valve 63a when the motor piston is parked.

In this embodiment it will be observed that the power coupler unit comprises a timing device 100a and also a power switching arrangement 95a, 118 by which the power is intermittently and effectively applied to the primary piston. The check valve 120 seats to preclude the atmospheric pressure admitted through the chamber port 66a from entering and upsetting the timing device.

FIGS. 12, 13, and 14 disclose a further embodiment of the invention as applied to a hydraulic system. The motor 130 has an arcuate chamber 131 and a vane-like piston 132 fixed upon a shaft 133. Liquid under pressure is admitted to the motor chamber through a control valve 134, a passage 135 and a distributing valve 136 of the spool or piston type, which in turn admits the pressurized liquid through a passage 137 into a valve chamber 138 from whence it is directed alternately to the opposite sides of the piston 132 by automatic valve mechanism including a valve disk 139 on the shaft 133 that is rocked back and forth by a shaft carried lug 140. The lug is splined to the shaft to rotate therewith, and a spring 141 is interposed between the lug and the valve 139 to press the latter upon the valve seat 142. The valve 139 is provided with spaced shoulders 143 and 144 for engagement by the lug 140. The control valve 134 is movable to and from its operating position by a wiper running and parking cable 145 for normal wiper operation, the wiper 1 being connected through suitable transmission 2 (FIG. 1) to the shaft 133 for being oscillated thereby. Movement of the control valve to arrest the wiper will automatically park the wiper out of the field of vision.

When it is desired to obtain a periodic cycling of the wiper, a secondary or cyclic cable 146 is manipulated to open the cycling valve 147 for admitting hydraulic pressure from the motor chamber 131 through port 148, passage 149, beyond a spring seated check valve 150, and passage 151 into the diaphragm chamber 152 beneath a diaphragm 153. The diaphragm is backed by a spring 154 which is retained in place by a cover plate 155 having a breather opening 156. The pressure build-up in diaphragm chamber 152 distends the diaphragm 153 against the spring urge to depress a pin 157 into a notch 158 in the valve disk 139 to delay the valve from shifting to its other position. In order to prevent injury to the mechanism at this time, the valve shoulder 144 is made yieldable so as to give or yield under the driving force of the shaft carried lug. This temporary restraint, imposed upon the automatic valve mechanism, enables the wiper motor to make one stroke away from its parked position and thereafter to return for an automatic parking. The passage 151 is provided with a drain opening 151' through which the hydrostatic pressure in chamber 152 may dissipate so that the spring 154 may function to restore the diaphragm to its normal pin-retracting position to release the valve 139 to complete its movement and to arrest and park the wiper. This drain opening 151' empties through a passage 159 into an exhaust or outlet manifold 160, the latter being connected in flow circuit relation to the inlet or control valve 134. The capacity of the drain opening will be relatively smaller than the passage 151 so as to give the latter preference for accomplishing its action on the diaphragm 153 to project the latch pin and arrest the valve 139 for the rest period. The drain or bleed opening may be adjustably restricted in size by a screw 161 to vary and to determine the length of the rest periods between wipes. After the release of the valve 139 by withdrawal of the latch pin 157, the spring 144 will kick the valve 139 to carry the wiper to its parked position for the start of another wiping cycle. The latch pin 157 may be connected directly to the diaphragm as in FIG. 9, or it may be off-set therefrom and connected by a lever 162.

The porting in the valve seat 142 is such as to also cause the operative shifting of the distributing spool valve 136 back and forth, and this shifting may be, for example, somewhat similar to that disclosed in the aforesaid Patent 2,802,232. The valve disk 139 is provided with a through port 163 for alternately opening one or the other of two passages 164 extending out to the opposite ends of the valve 136. Cooperating therewith is a recess 165 in the underside of the valve disk for connecting the companion passage 164 to an exhaust port 166 which in turn discharges into the exhaust manifold 160. The distributing valve 136 is provided with a central recess means for alternately connecting the two chamber ports 167 to the pressure supply passage 168 leading from the control valve 134, and likewise to open the exhaust passages 169 into the exhaust manifold 160.

It will be obvious from the foregoing that joint manipulation of the Bowden cables 145 and 146 will cause a periodic cycling of the wipers during which the motor piston 132 will move under the hydraulic pressure clockwise from the parked position shown in FIG. 12. When so positioned the valve 147 will admit the pressurized medium to the diaphragm chamber 152 to project the latch pin against the valve disk 139 to hold it for the duration of the rest period. In the event the recess 158 is out of registry with the pin, the latter is backed by a spring 170 to yield upon contacting the valve disk until the recess moves therebeneath. The power coupler unit has a power switching control 153, 157 and a timing device to regulate its intermittent action.

In each embodiment of the invention, the intermittent action will continue to operate the wiper throughout active periods, with one or more intervening rest periods, as long as the manually set secondary control remains operative. This periodic cycling action therefore continues as long as the operator of the vehicle desires and without any attention-distracting manipulation on his part following the setting of the secondary control of each embodiment.

There is thus provided a unique windshield cleaner system which combines a self-parking wiper mechanism for normal continuous use and a non-parking wiper mechanism for intermittent use, the arrangement being such that a primary control means is manipulated to obtain continuous reciprocation of the wiper, with a terminal parking arrest, and a secondary control means is manipulated to secure a cyclic or intermittent action to the exclusion of any parking between the active periods. The two controls may have a common actuator, or they may each have its own individual actuator. The parking means is precluded from functioning during the cyclic action. The wiper action is, in effect, withdrawn from the parking means for the duration of the intermittent operation and thereafter is restored thereto for finally disposing the wiper in a parked position.

The foregoing description has been given in detail without thought of limitation since the inventive teachings are capable of assuming other physical embodiments without departing from the spirit of the invention and the scope of the appended claims.

What is claimed is:

1. A windshield cleaner comprising a wiper, a motor operating the same to clean an associated windshield, primary control means for the motor including wiper-operating means and automatic wiper-parking means, and secondary control means for the motor including means for operating the wiper periodically with an intervening rest interval, said secondary control means excluding the operation of said wiper parking means following such interval.

2. A windshield cleaner comprising a wiper, a motor for operating the same, control means for the motor operable selectively to run and to park the wiper, automatic means cooperating with the motor to actuate the wiper intermittently with an intervening rest interval, and means independent of said control means for starting and stopping the automatic operation while precluding the parking of the wiper during the rest interval.

3. A windshield cleaner comprising a wiper, a motor for operating the same, control means for the motor operable selectively to run and to automatically park the wiper, automatic means operable to periodically actuate the wiper with a rest interval between two active periods, and manual means for initiating the automatic operation independently of the parking control means.

4. A windshield cleaner comprising a wiper, a motor for oscillating it, selective control means for the motor either to power actuate or to power park the wiper, and secondary means operable to actuate the wiper intermittently with an intervening rest interval between two active periods of wiper use, said secondary means precluding the power parking of the wiper during the rest interval.

5. A windshield cleaner comprising a wiper, a motor driving the same back and forth, control means for the motor selectively operable either to actuate the wiper steadily or to park it, and manually controlled automatic means operable to deenergize the parking means and to energize the motor intermittently for effecting active intervals of wiping with an intervening rest period.

6. A windshield cleaner comprising a wiper, a motor stroking the same back and forth, control means for the motor to power actuate the wiper for normal use or for power parking the wiper, automatic means manually controlled to render the power parking inoperative and operable to energize the motor intermittently with a rest interval occurring substantially between strokes, said automatic means including a thermal responsive power interrupter for the motor, and means for restoring the interrupted power communication.

7. A windshield cleaner comprising a wiper, a motor driving the same back and forth, control means for the motor to actuate the wiper steadily and to park it, automatic means selectively operable to energize the motor intermittently and independently of the parking control means throughout the intermittent operation, said automatic means including a power switch control for effecting the intermittent action of the wiper.

8. A windshield cleaner comprising a wiper, a motor operating the same to clean an associated windshield, a primary control means for the motor including wiper-operating means and wiper-parking means, and a secondary control means for the motor including manually controlled power means for momentarily arresting the wiper periodically, said wiper parking means being power actuated and yielding to the secondary control means for the periodic action but taking over to power park the wiper when the said secondary control means is inoperative.

9. A windshield cleaner system comprising a wiper, a motor for oscillating it and also for power parking it, and a control for the motor; and a power coupler unit for effecting periodic cycling operation of the motor and its wiper at predetermined intervals, and cyclic control means for the motor to so effect the periodic cycling operation to the exclusion of said parking control.

10. A windshield cleaner system comprising a wiper, a motor for oscillating it and also for power parking it, and a control for the motor; and a coupler unit for effecting periodic cycling operation of the motor and its wiper at predetermined intervals, and cyclic control means for the motor to so effect the periodic cycling operation, said coupler unit having a power sustaining device, and a timing device for interrupting the power sustaining device at given intervals.

11. A windshield cleaner comprising a wiper, a motor connected thereto for normal oscillating cleaning movement and for parking the same when arrested, manual control means for the motor for so acting upon the wiper and to power park the latter, automatic control means for the motor independent of the first control means and operable to actuate the wiper for a predetermined interval and then arresting the same intermittently, and secondary means cooperating with the control means for setting the automatic control means in operation independently of power parking of the wiper.

12. A windshield cleaner comprising a wiper, a motor connected thereto for normally operating and also for parking the wiper when arrested, control means for the motor for so acting upon the wiper and to park the latter by power, automatic control means for the motor operable to actuate the wiper for a predetermined interval and then arresting the same for being parked by said first control means, said automatic control means including cycling means operable automatically to effect periodic actuation of said automatic control means.

13. A windshield cleaner comprising a wiper, a motor connected thereto for normally oscillating and also for parking the same when arrested, control means for the motor for so acting upon the wiper and to power park the latter, automatic control means operable independently of the power parking for effecting periodic cycling of the wiper with a given interval of rest and means for restoring the wiper to the first control means for power parking.

14. A windshield cleaner according to claim 1, wherein the motor is electrically operated and included within an electric circuit, and said secondary means embodies a circuit interrupted for intermittently opening and closing said circuit independently of said automatic wiper-parking means.

15. A windshield cleaner according to claim 14, wherein said interrupter circuit bypasses the automatic wiper-parking means.

16. A windshield cleaner according to claim 1, wherein the motor is included within a fluid circuit and embodies automatic valve mechanism to operate the motor for oscillating the wiper, said secondary control means includes other valve means acting cooperatively with the valve mechanism to oscillate the wiper intermittently.

17. A windshield cleaner according to claim 16, wherein fluid operated timing means cooperates with the secondary control means to regulate the duration of the rest interval between adjacent active periods of wiper operation under the control of the secondary control means.

18. A windshield cleaner according to claim 16, wherein said automatic valve mechanism includes a valve movable back and forth by motor operation for automatically reversing the wiper, and means responsive to said secondary contral means to periodically arrest the automatic valve mechanism.

References Cited in the file of this patent

UNITED STATES PATENTS

| | | |
|---|---|---|
| 1,588,399 | Anderson | June 15, 1926 |
| 2,343,656 | Folberth et al. | Mar. 7, 1944 |
| 2,516,558 | Freedman et al. | July 25, 1950 |
| 2,680,262 | Jorgensen | June 8, 1954 |